United States Patent [19]
Ahvenainen

[11] Patent Number: 6,148,192
[45] Date of Patent: Nov. 14, 2000

[54] CHECKING THE ACCESS RIGHT OF A SUBSCRIBER EQUIPMENT

[75] Inventor: Jouko Ahvenainen, Helsinki, Finland

[73] Assignee: Nokia Telecommunications OY, Espoo, Finland

[21] Appl. No.: 08/913,868

[22] PCT Filed: Apr. 30, 1996

[86] PCT No.: PCT/FI96/00236

§ 371 Date: Sep. 18, 1997

§ 102(e) Date: Sep. 18, 1997

[87] PCT Pub. No.: WO96/35304

PCT Pub. Date: Nov. 7, 1996

[30] Foreign Application Priority Data

May 4, 1995 [FI] Finland ................................. 952146

[51] Int. Cl.[7] ................................................ H04M 1/66
[52] U.S. Cl. ..................... 455/410; 455/411; 455/558; 379/357
[58] Field of Search .................................... 455/411, 433, 455/558, 414, 415, 557, 410; 379/88.21, 357; 340/825.34

[56] References Cited

U.S. PATENT DOCUMENTS

| | | | |
|---|---|---|---|
| 5,384,834 | 1/1995 | Sato et al. | 379/88.21 |
| 5,404,580 | 4/1995 | Simpson et al. | 455/558 |

(List continued on next page.)

FOREIGN PATENT DOCUMENTS

| | | |
|---|---|---|
| 448 369 | 9/1991 | European Pat. Off. . |
| 607 767 | 7/1994 | European Pat. Off. . |
| 0607767A1 | 7/1994 | Sweden ............................. G07F 7/10 |
| 2 248 999 | 4/1992 | United Kingdom . |
| 95/01695 | 1/1995 | WIPO . |

OTHER PUBLICATIONS

European digital cellular telecommunications system (Phase 2) . . . , European Telecommunications Standards Institute ETS 300 508, Sep. 1994, pp. 1–9 (GSM 02.17).

European digital cellular telecommunications system (Phase 2) . . . , European Telecommunications Standards Institute ETS 300 509, Nov. 1994, pp. 1–15 (GSM 03.03).

(List continued on next page.)

Primary Examiner—Dwayne D. Bost
Assistant Examiner—Sonny Trinh
Attorney, Agent, or Firm—IP Group of Pillsbury Madison & Sutro, LLP

[57] ABSTRACT

A method for checking the access right of a subscriber equipment, whereupon a mobile equipment can be formed by attaching the subscriber identification module to any subscriber equipment. Before the subscriber identification module is detached from the subscriber equipment, the equipment identity of this subscriber equipment is stored in the subscriber identification module. After the subscriber identification module has been connected to the subscriber equipment, the equipment identity stored in the subscriber identification module is compared in the mobile equipment formed with the equipment identity of the subscriber equipment of the combination. When the equipment identities are identical, a first alternative for checking the access right is selected, and when the equipment identities are different, a second alternative for checking the access right is selected.

28 Claims, 2 Drawing Sheets

U.S. PATENT DOCUMENTS

| | | | |
|---|---|---|---|
| 5,418,837 | 5/1995 | Johansson et al. | 455/558 |
| 5,497,411 | 3/1996 | Pellerin | 455/411 |
| 5,537,474 | 7/1996 | Brown et al. | 455/411 |
| 5,675,628 | 10/1997 | Hokkanen | 455/433 |
| 5,742,912 | 4/1998 | Gallant et al. | 455/566 |
| 5,854,976 | 12/1998 | Aguilera et al. | 455/411 |
| 5,933,773 | 8/1999 | Barvesten | 455/411 |
| 5,940,773 | 8/1999 | Barvesten | 455/458 |
| 5,943,624 | 8/1999 | Fox et al. | 455/556 |
| 6,012,634 | 1/2000 | Brogan et al. | 235/380 |

OTHER PUBLICATIONS

European didital cellular telecommunications system (Phase 2) . . . , European Telecommunications Standards Institute ETS 300 523, Sep. 1994, pp. 1–20 (GSM 03.03).

European Telecommunications Standards Institute, Recommendation GSM 09.02 Mobile Application Part Specification, Jan. 1991, pp. 1, 25, 27–39, 41, 35–39, 55–57, 67–70, 271–280, 324–402,420.

European digital cellular telecommunications system (Phase 2) . . . European Telecommunications Standards Institute ETS 300 608, Nov. 1994, pp. 1–93, (GSM 11.11).

CHECKING THE ACCESS RIGHT OF A SUBSCRIBER EQUIPMENT

FIELD OF THE INVENTION

The invention relates to a method for checking the access right of a subscriber equipment in a mobile telephone system including a network infrastructure and mobile equipment. Each mobile is a combination of a subscriber equipment provided with an equipment identity and of an individual subscriber identification module that is detachably connected to the subscriber equipment, whereupon a mobile equipment can be formed by attaching the subscriber identification module to any subscriber equipment.

The invention relates to a mobile telephone system wherein subscribers and terminal equipments are not permanently connected together, and especially to terminal equipments and subscriber identification modules, such as SIM (Subscriber Identity Module) cards, situated in these networks. Such systems include for example cellular networks including telephones wherein a subscriber is identified by a subscriber-specific subscriber identification module placed in the telephone. An example of such cellular communications systems is the GSM system (Global System for Mobile Communications). Another example of such mobile telephone systems is the TETRA (Trans European Trunked Radio) mobile telephone system. The TETRA mobile telephone system is an example of PMR (Private Mobile Radio) mobile systems.

BACKGROUND OF THE INVENTION

A subscriber identification module, such as a SIM card, is subscriber-specific, whereby the subscriber equipments are not bound to a certain subscriber. A subscriber identification module, for example a SIM card or a GSM card, is a functional card or a smart card that is placed in the mobile equipment and that contains information required for subscriber identification and for encryption of radio traffic. In the present application, a subscriber identification module, for example, a SIM card, refers to a functional card, which can be removed from the mobile equipment and with which a subscriber can use the card-controlled mobile equipment.

It is therefore not necessary for the user to own a mobile telephone, but it is sufficient to have a subscriber identification module, such as a SIM card (Subscriber Identity Module), that is allocated by the operator of the mobile telephone system and that is, in a way, a phone card with which the subscriber can make (and receive) calls from any mobile equipment in the system.

The subscriber identification module can be a smart card which has the same outer dimensions as most common credit cards. An alternative form of a SIM card in hand-held mobile phones is the plug-in-SIM, which is a coin-sized element containing the electronics of the card. The plug-in-SIM is placed in a telephone so that it is not easy for the user to change it. A telephone may also comprise both a stationary plug-in-SIM and a card reader. If the card reader contains a card, the telephone is identified according to the external card. Otherwise the telephone is identified according to the stationary plug-in-SIM. In the present patent application, a subscriber identification module, for example a SIM card, refers to both plug-in-SIM and a smart-card SIM, unless otherwise mentioned.

GSM recommendation 02.17 (Subscriber Identity Modules, ETSI) generally defines the operation of the SIM card. It defines the terms related to the SIM card, sets the requirements for the security of the SIM card and for the functions of the highest level, and determines the tasks of the network operator and the information to be stored in the SIM card. It also determines the minimum requirements for a SIM card of a user interface of a telephone, such as a mobile phone, as regards, for example, the input and change of the personal identification number (PIN) of the user.

Further, GSM recommendation 11.11 (SIM Application Protocol, ETSI) describes in more detail the matters disclosed in the above-described GSM recommendation 02.17 by determining, for example, the protocol between the SIM card and the mobile equipment (ME), the content and lengths of the data fields of the SIM card, and matters related to the electrical and mechanical connection. GSM specification 11.11 assumes designers are able to realize both the software and hardware implementation of a SIM interface.

It is known in connection with mobile telephone systems that the mobile subscriber has an identity by which the subscriber equipment can be identified and which indicates, for example, the manufacturer of the subscriber equipment. The mobile phone networks comprise a function wherein the subscriber equipment identity, in the GSM system, the international mobile equipment identity (IMEI) of the subscriber, is checked, by requesting the equipment identity from the subscriber. The equipment identity of the subscriber is checked, for example, to ensure that the subscriber equipment may be used in the network, i.e., that the particular equipment is not stolen or indicated as faulty, which means that its use will not cause interference or other problems in the network. The detailed structure of a subscriber equipment identity in connection with the GSM system is described in GSM standard 03.03, Numbering, Addressing and Identification, version 3.5.0, January 1991, ETSI. The subscriber equipment identity can be typically requested from the subscriber, for example, whenever the subscriber equipment has established a connection with the mobile telephone exchange. One manner of requesting for the subscriber equipment identity of the subscriber is described in the GSM standard 09.02, Mobile Application Part Specification version 3.8.0, January 1991, ETSI, item 5.9.1, Figure 5.9.1. The section also describes how the subscriber equipment identity is then transmitted to the equipment identity register (EIR) that checks whether the subscriber equipment has the right to use the services of the mobile telephone system, i.e., the register checks the access right of the subscriber equipment. The connection from the EIR to the mobile telephone exchange via an F interface is described in item 5.1 of the same standard, especially in Figure 5.1.1.

The EIR or some other part of the mobile telephone network comprises lists according to, for example, the GSM standard 02.16 (International MS Equipment Identities version 3.0.1, 1992, ETSI). The lists contain subscriber equipment identities or a series of subscriber equipment identities and have list identifiers. The standard uses colors as list identifiers that naturally signify, for example numerical identifiers. White or a white identifier is the list identifier of the list consisting of all numerical series containing equipment identities that have been allocated by the operators using the same mobile telephone system, i.e. in this case, the GSM system, to the subscriber equipment that can be used in the networks concerned. These numerical series are set forth by only indicating the first and last numbers of the series, i.e., not by listing the identities of individual subscriber equipments. A list marked black or a black list identifier contains the identities of all the subscriber equipment that must be denied access to the mobile network or to the mobile equipment, for example, because the subscriber equipment concerned is faulty and might cause interference in the mobile system itself or because the equipment has been stolen.

When use of a subscriber equipment is to be prevented in the mobile network or when, for example, a disabling signal is to be transmitted to a subscriber equipment, the access right of the subscriber equipment must be checked, for example, in the above-described manner. A typical situation requiring preventing use of a subscriber equipment or closing of the equipment occurs when the subscriber or terminal equipment has been stolen and its use is to be prevented. In such a case, a closing message must be transmitted to the unauthorized subscriber equipment or the equipment must be rendered inoperative in some other manner.

As described above, it is known in the GSM mobile system that the mobile network checks the access right of a subscriber equipment by randomly requesting the identity data of the subscriber equipment from the equipment and by examining from its own equipment identity register (EIR) whether the use of the subscriber equipment is permitted in the network. However, the equipment identity of a subscriber equipment is not necessarily requested for, nor is the aforementioned checking performed in connection with each registration. Therefore, there may be long periods during which the access right of the subscriber equipment is not checked. On the other hand, it is possible, in the GSM system, to request the identity of the subscriber equipment, and thus, check the access right of the equipment randomly, at random intervals.

If the checks are random, the checks load the radio path, the equipment on the path, and the data links between the exchange concerned and the equipment database, even though there is no reason to suspect that the equipment of the subscriber is on the black list of the EIR.

Random checks do not prevent the use of a stolen equipment, if there happens to be no checks. This problem can be amended by performing checks more often, but this in turn loads the connections and equipment even more.

Yet another alternative for checking the access right of a subscriber equipment is to perform the check by the subscriber equipment identity in the EIR in connection with each registration.

Such transmission of the equipment data and checking of the data in the EIR performed in connection with each registration load the equipment and the system considerably, since it is then necessary to transmit over the radio path the subscriber equipment identity that may be rather long, for example, according to a standard of the TETRA system: 60 bits. It is not preferable to transmit an identity of such a length frequently over the radio path, since the frequent transmission requires a considerable amount of transmission capacity.

SUMMARY OF THE INVENTION

The purpose of the present invention is to solve problems related to the prior art arrangements. The objective of the invention is to implement a method and a mobile equipment by which the checking of the access right of a subscriber equipment can be started that the subscriber equipment using the mobile network have the right to use the network so that the telecommunication equipment and the subscriber equipment register of the mobile network are not overloaded.

This method for checking the access right of a subscriber equipment is achieved with the method of the present invention. The method includes before the subscriber identification module is detached from the subscriber equipment, the equipment identity of this subscriber equipment is stored in the subscriber identification module; after the subscriber identification module has been connected to the subscriber equipment, the equipment identity stored in the subscriber identification module is compared in the mobile equipment formed with the equipment identity of the subscriber equipment of the combination; and when the equipment identities are identical, first alternative for checking the access right is selected, and when the equipment identities are different, a second alternative for checking the access right is selected.

The invention further relates to a method for checking the access right of a subscriber equipment in a mobile telephone system including a network infrastructure and mobile equipment each mobile equipment is a combination of a subscriber equipment and a subscriber identification module that is provided with a subscriber identity and is detachably connected to the subscriber equipment, whereupon a mobile equipment can be formed by attaching the subscriber identification module to any subscriber equipment.

The method according to the present invention including before the subscriber identification module is detached from the subscriber equipment, the subscriber identity contained in the subscriber identification module is stored in the subscriber equipment; after the subscriber identification module has been attached to the subscriber equipment, the subscriber identity stored in the subscriber identification module is compared in the mobile equipment formed with the subscriber identity stored in the subscriber equipment of the combination; and when the subscriber identities are identical, a first alternative for checking the access right is selected, and when the subscriber identities are mutually different, a second alternative for checking the access right is selected.

The invention further relates to a method for checking the access right of a subscriber equipment in a mobile telephone system including a network infrastructure and mobile equipment, each mobile equipment is a combination of a subscriber equipment provided with an equipment identity and of an individual subscriber identification module that is detachably connected to the subscriber equipment, whereupon a mobile equipment can be formed by attaching the subscriber identification module to any subscriber equipment.

Such a method according to the invention including comparing in the mobile equipment, the subscriber equipment identity stored in the subscriber identification module with the equipment identity of the subscriber equipment of the combination: and based on the comparison, continuing registration of the mobile equipment onto the network infrastructure, if the subscriber identification module contains the subscriber equipment identity, or checking the access right of the subscriber equipment from the network infrastructure, if the subscriber identification module does not contain the identity of the subscriber equipment, and as a result of the checking of the access right of the subscriber equipment, storing the identity of the subscriber equipment in the subscriber identification module and continuing registration of the mobile equipment onto the network infrastructure, if the subscriber equipment has the access right to the network infrastructure.

The invention further relates to a method for checking the access right of a subscriber equipment in a mobile telephone system including a network infrastructure and mobile equipment, each mobile equipment is a combination of a subscriber equipment and a subscriber identification module that is provided with a subscriber identity and that is detachably connected to the subscriber equipment, whereupon a mobile equipment can be formed by attaching the subscriber identification module to any subscriber equipment.

The method according to the invention includes comparing in the mobile equipment the subscriber identity stored in the subscriber identification module with the subscriber identity stored in the subscriber equipment of the combination and based on the; continuing registration of the mobile equipment onto the network infrastructure, if the subscriber identity stored in the subscriber equipment of the combination is identical to the subscriber identity stored in the subscriber identification module, or checking the access right of the subscriber equipment from the network infrastructure if the subscriber identity stored in the subscriber equipment of the combination is not identical to the subscriber identity stored in the subscriber identification module, and as a result of the checking of the access right of the subscriber equipment storing the identity of the subscriber in the subscriber equipment and continuing the registration of the mobile equipment onto the network infrastructure, if the subscriber equipment has the access right to the network infrastructure.

The invention further relates to a mobile equipment including a subscriber equipment provided with an equipment identity, and an individual subscriber identification module that is detachably connected to the subscriber equipment.

The mobile equipment according to the invention includes comparing means for comparing an equipment identity stored in the subscriber identification module with the equipment identity of the subscriber equipment, and based on the comparison, when the equipment identities are identical, for activating a first alternative for checking the access right, and when the equipment identities are different, for activating a second alternative for checking the access right.

The invention further relates to a mobile equipment including a subscriber equipment and a subscriber identification module that is provided with a subscriber identity and that is detachably connected to the subscriber equipment.

The mobile equipment according to the invention also includes a comparing means for comparing a subscriber identity stored in the subscriber identification module with the subscriber identity stored in the subscriber equipment, and based on the comparison, when the subscriber identities are identical, for activating a first alternative for checking the access right, and when the subscriber identities are different, for activating a second alternative for checking the access right.

A first embodiment of the invention is based on the idea that a subscriber identification module, for example, a SIM card, in a mobile telephone system stores the identity data of the terminal equipment, i.e., the equipment identity of the subscriber equipment where the card concerned was used last. The equipment identity may be, for example, the IMEI number of the subscriber equipment. When a terminal equipment comprising a subscriber identification module, such as the SIM card, is switched on, or correspondingly, if a subscriber identification module is placed in the terminal equipment, it is checked whether the identity of the subscriber equipment is identical to the subscriber equipment identity stored in the card memory. If the subscriber identification module, for example, the SIM card, is used in a different equipment than at the previous occasion, the subscriber equipment identity is transmitted to the network, which then checks the validity of the terminal equipment in a suitable manner, for example, by verifying the access right of the subscriber equipment from the equipment identity register.

According to the invention, in mobile networks where the subscriber is not bound to a certain terminal equipment, the subscriber identification module, i.e., the SIM card, stores the identity of the equipment where the card was used last, and the terminal equipment transmits its own identity to the network, if the equipment identity on the card differs from the identity of the equipment concerned.

A second embodiment of the invention is based on the idea that a subscriber equipment in a mobile telephone system, i.e., the actual equipment section of the mobile equipment, stores the identity of the subscriber whose subscriber identification module, for example, the SIM card, has been connected to the subscriber equipment concerned. The subscriber identity may be for example the MSISDN number or ITSI (Individual TETRA Subscriber Identity) of the subscriber. When a terminal equipment comprising a subscriber identification module, for example, a SIM card, is switched on, or correspondingly, if the terminal equipment is provided with a subscriber identification module, it is checked whether the subscriber identity stored in the subscriber equipment corresponds to the subscriber identity in the subscriber identification module concerned. Correspondingly, in the same manner as in the first embodiment of the invention, if the subscriber identification module, for example, the SIM card, is used in a different equipment than at the previous occasion, the identity of the subscriber equipment is transmitted to the network, which then checks the validity of the terminal equipment in a suitable manner, for example by verifying the access right of the subscriber equipment from the subscriber equipment register.

According to the invention, in mobile networks where a subscriber is not bound to a certain terminal equipment, the subscriber equipment stores the identity of the subscriber whose subscriber identification module, for example, a SIM card, was last connected to the subscriber equipment concerned. The terminal equipment then sends its own identity to the network for the verification of the validity of the equipment, if the subscriber identity stored in the subscriber equipment differs from the subscriber identity stored in the subscriber identification module concerned.

The advantage of such an arrangement according to the invention is that the subscriber equipment identity is not transmitted and checked randomly, nor is the checking performed too often so that it would overload the system resources. The system checks the data only when there is a real reason to suspect that the equipment is not used by an authorized user, for example. The loading on the exchange, terminal equipment, radio link, equipment database and data links is decreased and the operation becomes faster, but a high level of security is maintained.

The arrangement according to the invention increases security also because in the system according to the invention a subscriber will not be able to avoid checks when using an illegal equipment since the access rights of subscriber equipments are checked particularly in situations where it is likely that the subscriber equipment is not used by an authorized user.

Further, the arrangement according to the invention provides faster detection of unauthorized equipment in the system compared to random checking. For example, in different networks of authorities, this is very important, since there are very high requirements for information security. The use of a stolen equipment must be detected immediately after the theft has occurred, and an unauthorized user must not be able to use the radio for a long time. Unauthorized use can be minimized with the present invention.

The invention provides the advantage that in the arrangement thereof the use of an equipment and a subscriber connection can be prevented after a theft or a disappearance, but nevertheless it is not necessary to check the equipment data in most cases of equipment registration.

If an unauthorized holder of an equipment uses the preceding subscriber identification module, for example, a SIM card, in the equipment, the use of the equipment and the subscriber connection can be prevented if it is known that this subscriber equipment or connection should be closed, whereupon the identity thereof can be set on the black list of the system. In such a case, when the data of this subscriber is checked, the equipment identity and possibly the location in the network can be seen from the subscriber data, whereupon the network can force the subscriber equipment to close. The subscriber data may also be supplemented with information causing the closing of the equipment during the next registration. The checking and identification of subscriber data from the mobile system registers and the possible prevention of the use of the equipment, based merely on equipment data, are thus necessary only in cases where an equipment that is in unauthorized use is not used with the same subscriber identification module, for example a SIM card, as previously.

BRIEF DESCRIPTION OF THE FIGURES

The invention will be described in greater detail with reference to the accompanying drawings, in which.

DETAILED DESCRIPTION OF THE CURRENTLY PREFERRED EMBODIMENT OF THE INVENTION

In the method according to the invention, the transmission of an identity, and therefore, activation of the checking of the access right of a subscriber equipment, can be limited completely or in part to situations where there is a reason for checking the subscriber equipment.

The advantages of the invention become evident, for example, in a situation where a subscriber equipment has been stolen and the new user uses the equipment with another SIM card. If the thief uses the equipment with a new SIM card, the use of the equipment and the subscriber connection can be prevented on based on a check of the SIM card, since the check is activated because the SIM card stores an equipment identity that is different from the identity of the equipment used. Or, according to a second embodiment of the invention, the subscriber equipment stores a subscriber identity different from the one stored in the SIM card.

Figure 1:
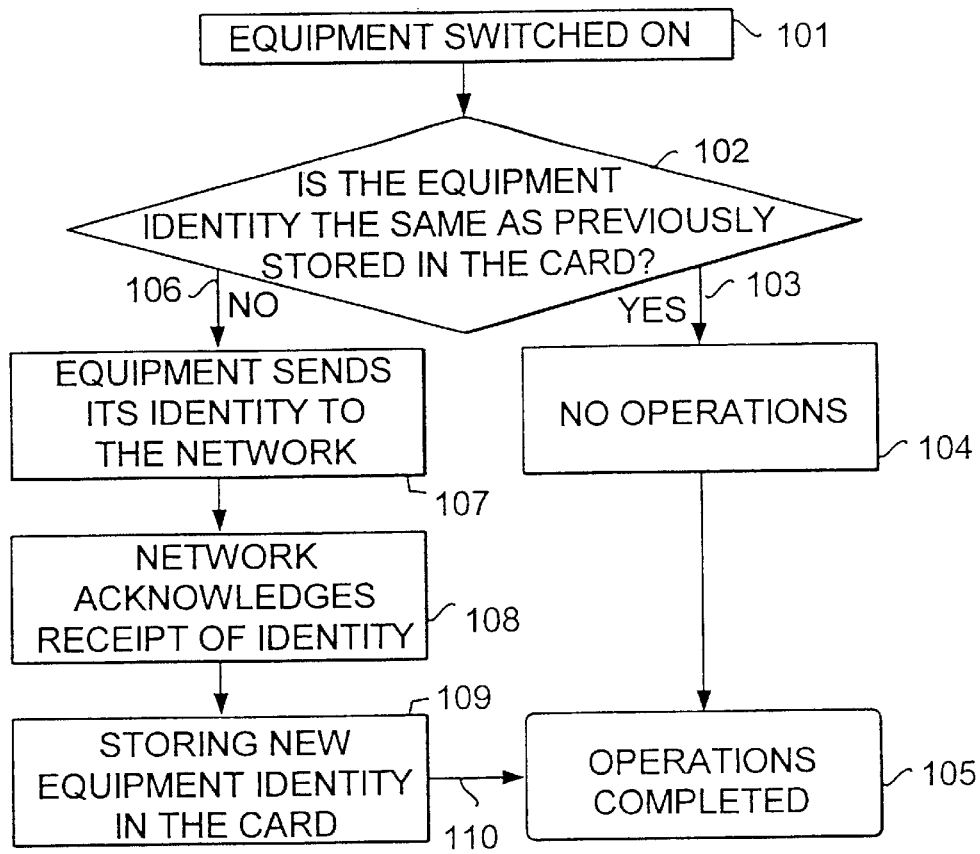
FIG. 1 is a flow chart of the operation of the method according to a first embodiment of the present invention.

FIG. 1 shows an arrangement according to a first embodiment of the invention wherein a SIM card of a subscriber in a mobile telephone system stores the identity of the equipment wherein the card was last positioned. When the terminal equipment is switched on 101, the equipment identity and the subscriber equipment identity stored in the card are checked 102. If the identities differ from each other 106, the equipment transmits 107 its identity to the network by using suitable signaling reserved for the purpose. When the network has acknowledged 108 receipt of the equipment identity, the identity is stored 109 in the SIM card. On the other hand, if the identities are identical 103, no unusual operations 104 occur, but the subscriber equipment continues its registration onto the network, if necessary. After steps 104 and 109, the method proceeds to step 105 where all operations have been performed.

After the network has received the equipment identity, it can perform, in the desired manner, operations for checking the validity of the equipment. It is important that a new identity is not stored in the SIM card until the identity data has been transmitted to the network, since otherwise the user might be able to change the identity data on the card without a check by rapidly switching the equipment on and off.

Figure 2:
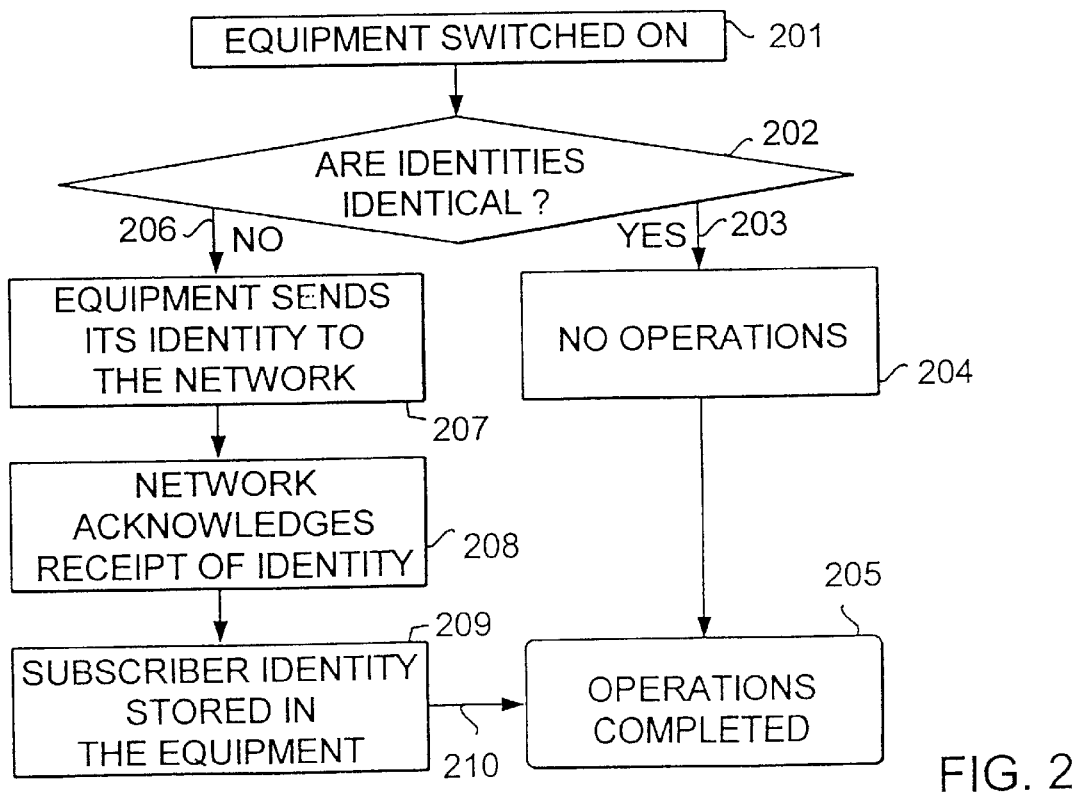
FIG. 2 is a flow chart of the operation of the method according to a second embodiment of the present invention.

FIG. 2 is a flow chart of the operation of the method according to a second embodiment of the invention. A subscriber equipment in a cellular network stores the identity of the subscriber whose card was last used in the subscriber equipment concerned. When the terminal equipment is switched on 201, the subscriber identity of the preceding SIM card stored in the subscriber equipment is compared 202 with the subscriber identity contained in the subscriber identification module. If the identities differ 206 from each other, the equipment transmits 207 its identity to the network in order for the validity of the equipment to be checked. When the network has acknowledged 208 receipt of the equipment identity, the identity of the subscriber is stored 209 in the subscriber equipment, i.e., in the equipment section of the mobile equipment. If the identities are identical 203, no unusual operations 204 occur, but the subscriber equipment continues its registration onto the network, if necessary. After steps 204 and 209, the method proceeds to step 205 where all operations have been performed.

The above is thus a representation of the alternative according to the second embodiment of the invention, wherein the memory of a terminal equipment stores the identity of the SIM card used last in the equipment, i.e., the identity of the last subscriber. However, this arrangement would be less suitable, for example, for a radio network used by authorities. A typical use by authorities may be, for example, a situation where one work unit uses during its work shift the same handheld mobile phones and a car phone as the other work units performing the same task during other work shifts. In such a case, the SIM card data to be stored in the equipment would differ from the SIM card identity of the new patrol whenever a work shift changes, whereupon according to the second embodiment of the invention the validity of the subscriber equipment would always be checked after a work shift has changed.

Figure 3:
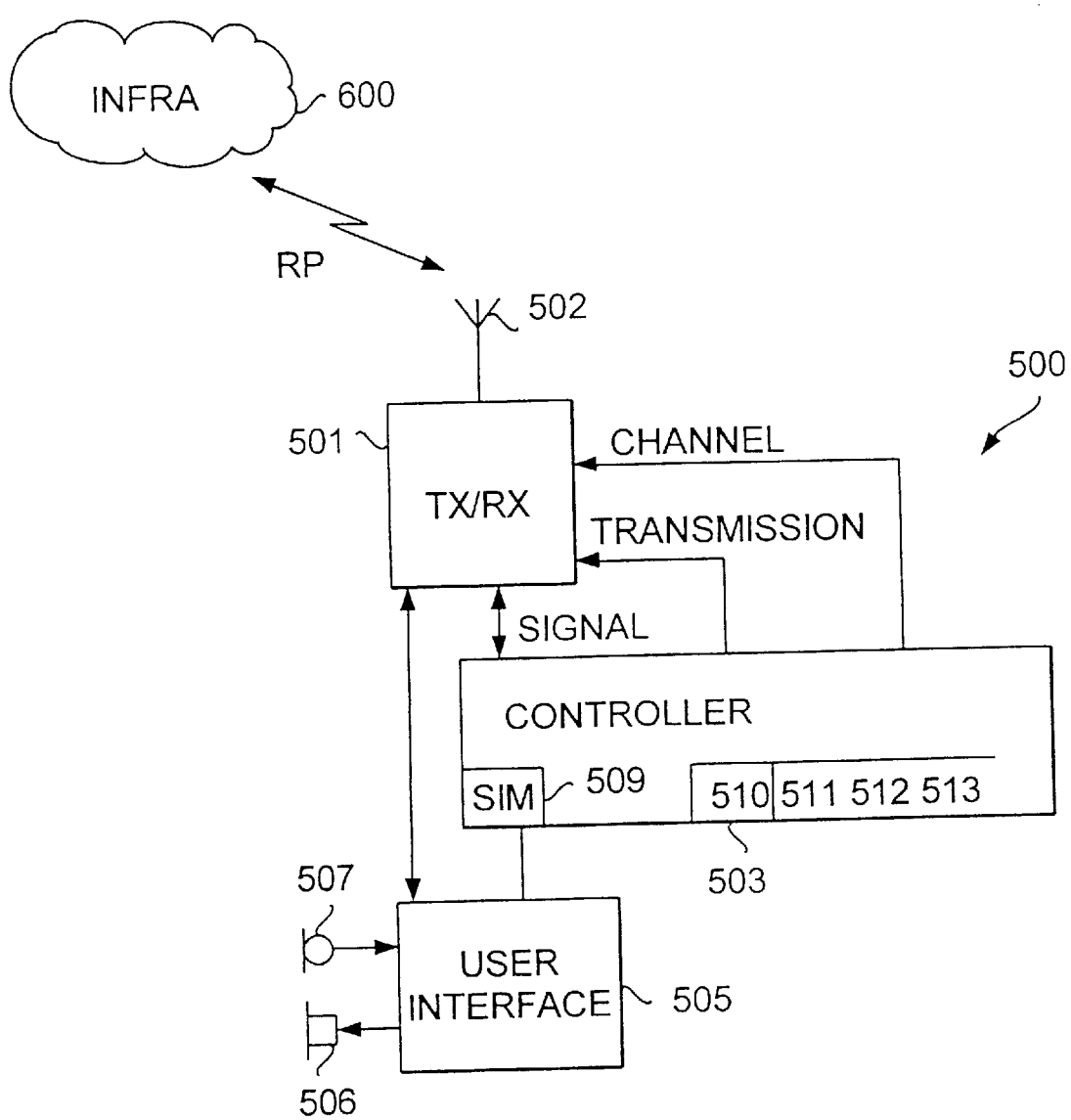
FIG. 3 is a block diagram of a mobile equipment according to present invention.

FIG. 3 is a block diagram of a radio unit according to the invention. The figure shows a network infrastructure (INFRA) 600 of a mobile telephone system. The network infrastructure includes for example base stations, exchanges and other telecommunication equipment. FIG. 3 shows a typical radio unit 500 operating in a mobile telephone system, i.e., a radio phone, a mobile phone, or, for example, a subscriber station used by a subscriber. The function of a transmitter-receiver (TX/RX) 501 is to adapt itself to the radio channel used, the mobile equipment communicating with the network infrastructure by the radio channel. The transmitter-receiver 501 comprises an associated antenna 502 that is connected to the radio path RP. The radio frequencies generally used are between 60 and 1000 MHz (VHF and UHF ranges), even though other frequencies can also be used. Analog or digital modulation can be used over the radio path RP.

The user interface 505 comprises electroacoustic converting means, or converter typically an earpiece 506 and a microphone 507 and possibly buttons related to the establishment, termination, and selection of a call. Mobile equipments used in the trunking systems may also includes a speak button that must be pressed when speaking.

The purpose of a controller 503 is to control the operation of the radio unit. The controller 503 is connected to the user interface 505 from which it receives the impulses related to, for example, the establishment and termination of a call. The controller 503 may also give to the user, via the user interface 505, acoustic or visual signs related to the operation of the radio phone and/or the mobile telephone system.

The controller 503 is connected to the transmitter-receiver TX/RX 501. The channel used by the transmitter-receiver is determined by the controller 503, i.e., the transmitter-receiver 501 is tuned to the channel determined by the controller 503, e.g, to a radio frequency and to a suitable time slot. The transmitter-receiver 501 is also switched on under the direction of the controller 503. The controller 503 receives and transmits signaling messages via the transmitter-receiver 501. The mobile equipment or radio unit 500 according to the invention can be used, for example, in a radio system including a radio network having at least one base station, subscriber stations, and possibly one or more repeater stations. In such a case, the radio unit concerned includes a transmitter-receiver unit 501 for receiving transmissions sent by other radio units or base stations and for transmitting transmissions to these radio units or base stations, a control unit 503 for controlling the functions of the radio unit, and a user interface 504.

A mobile equipment according to the first embodiment of the invention includes a subscriber equipment that is provided with an equipment identity and that has a transmitter-receiver unit 501, a controller 503 and a user interface 505. The mobile equipment also includes an individual subscriber identification module 509 that is detachably connected to the aforementioned subscriber equipment, thus forming a mobile equipment. The subscriber identification module is, for example, a SIM card. The mobile equipment according to the invention also includes a comparing means 510 for comparing the equipment identity stored in the subscriber identification module with the equipment identity of the aforementioned subscriber equipment, and based on the aforementioned comparison, when the equipment identities are identical, for activating the first alternative for checking the access right, and when the equipment identities are different, for activating the second alternative for checking the access right.

The mobile equipment according to the invention also includes storing means 511 for storing the aforementioned equipment identity in the subscriber identification module concerned. In response to the checking of the access right of the subscriber equipment, the storing means 511 may have been arranged to store the equipment identity in the subscriber identification module.

A mobile equipment according to the second embodiment of the invention includes a subscriber equipment has a transmitter-receiver unit 501, a controller 503, and a user interface 505. The mobile equipment also includes a subscriber identification module 509 that is provided with a subscriber identity and that is detachably connected to the aforementioned subscriber equipment. The mobile equipment according to the invention also includes comparing means 512 for comparing the subscriber identity in the subscriber identification module with the subscriber identity stored in the aforementioned subscriber equipment, and based on this comparison, when these subscriber identities are identical, for activating the first alternative for checking the access right, and when the subscriber identities are different, for activating the second alternative for checking the access right.

The mobile equipment according to the invention also includes storing means 513 for storing the aforementioned subscriber identity in the subscriber equipment concerned. In response to the checking of the access right of the subscriber equipment, the storing means 513 are arranged to store the subscriber identity in the subscriber equipment.

The drawings and the related description are only intended to illustrate the idea of the invention. The details of the method according to the invention for checking the access right of a subscriber equipment in a mobile telephone system may vary within the scope of the claims. Even though the invention is described above mainly in connection with the GSM and TETRA mobile systems, the invention can be used in further developments of these systems and in other kinds of mobile telephone systems, too.

The arrangements according to the invention do not define how the actual equipment data is checked in the network. The arrangements according to the invention operate in such a way that a subscriber equipment starts the checking of the validity of the subscriber equipment in questionable situations, i.e. when the subscriber identity stored in the equipment does not correspond to the identity of the present subscriber or when the subscriber equipment identity does not correspond to the subscriber equipment identity previously stored in the SIM card. The comparison according to the invention of the identity on the card and the equipment identity, and the comparison of the subscriber identity with the stored subscriber identity can be performed by the card or the terminal equipment.

A currently preferred embodiment is an alternative where the comparison of the equipment data is performed by the terminal equipment, which has processing capacity suitable for the purpose. This is also sensible due to the fact that the terminal equipment performs the transmission of the equipment identity to the mobile network and to the equipment identity register thereof.

What is claimed is:

1. A method for checking the access right of a subscriber equipment in a mobile telephone system comprising a network infrastructure and a plurality of mobile equipment, each said mobile equipment being a combination of a subscriber equipment provided with an equipment identity and an individual subscriber identification module that is detachably connected to said subscriber equipment, whereupon a mobile equipment can be formed by attaching said subscriber identification module to any subscriber equipment, said method comprising:

before said subscriber identification module is detached from said subscriber equipment, storing said equipment identity of said subscriber equipment in said subscriber identification module;

after said subscriber identification module has been connected to any said subscriber equipment, comparing said equipment identity stored in said subscriber identification module to said equipment identity stored in said subscriber equipment of the combination; and when said equipment identities are identical, selecting a first alternative for checking the access right; and when said equipment identities are different, selecting a second alternative for checking the access right.

2. A method for checking the access right of a subscriber equipment in a mobile telephone system comprising a network infrastructure and a plurality of mobile equipment, each said mobile equipment being a combination of a subscriber equipment and a subscriber identification module that is provided with a subscriber identity and that is detachably connected to said subscriber equipment, whereupon a mobile equipment can be formed by attaching said subscriber identification module to any subscriber equipment, said method comprising:

before said subscriber identification module is detached from said subscriber equipment, storing said subscriber identity contained in said subscriber identification module in said subscriber equipment;

after said subscriber identification module has been attached to said subscriber equipment, comparing any said subscriber identity stored in said subscriber identification module to said subscriber identity stored in said subscriber equipment of the combination; and when said subscriber identities are identical, selecting a first alternative for checking the access right, whereupon registration of said mobile equipment onto said network infrastructure is continued, and when said subscriber identities are different, selecting a second alternative for checking the access right, whereupon the access right of said subscriber equipment is checked by said network infrastructure.

3. The method according to claim 1, wherein, in said first checking alternatives, registration of said mobile equipment onto said network infrastructure is continued.

4. The method according to claim 1, wherein, in said second checking alternative, the access right of said subscriber equipment is checked by said network infrastructure.

5. The method according to claim 4, wherein, as a result of checking the access right of said subscriber equipment, said subscriber identity of said subscriber equipment is stored in said subscriber identification module and registration of said mobile equipment onto said network infrastructure is continued, if said subscriber equipment has access right to said network infrastructure.

6. The method according to claim 2, wherein, as a result of said checking the access right of said subscriber equipment, said subscriber identity contained in said subscriber identification module is stored in said subscriber equipment, and registration of said mobile equipment onto said network infrastructure is continued, if said subscriber equipment has access right to said network infrastructure.

7. The method according to claim 2 or 4, wherein, as a result of checking the access right of said subscriber equipment, operation of said mobile equipment is terminated, if said subscriber equipment does not have the access right to said network infrastructure.

8. The method according to claim 1 or 2, wherein said comparison is performed in said subscriber equipment.

9. The method according to claim 1 or 2, wherein said comparison is performed in said subscriber identification module.

10. The method for checking the access right of a subscriber equipment in a mobile telephone system comprising a network infrastructure and a plurality of mobile equipment, each said mobile equipment being a combination of a subscriber equipment provided with an equipment identity and an individual subscriber identification module that is detachably connected to said subscriber equipment, whereupon a mobile equipment can be formed by attaching said subscriber identification module to any subscriber equipment, said method comprising:

a) comparing in said mobile equipment said subscriber equipment identity stored in said subscriber identification module with said equipment identity of said subscriber equipment of the combination;
based on said comparison, b) continuing registration of said mobile equipment onto said network infrastructure, if said subscriber identification module contains said subscriber equipment identity, or c) checking the access right of said subscriber equipment by said network infrastructure, if said subscriber identification module does not contain said subscriber identity of said subscriber equipment; and
as a result of said checking of access right of said subscriber equipment, d) storing said subscriber identity of said subscriber equipment in said subscriber identification module and continuing registration of said mobile equipment onto said network infrastructure if said subscriber equipment has access right to said network infrastructure.

11. A method for checking the access right of a subscriber equipment in a mobile telephone system comprising a network infrastructure and a plurality of mobile equipment, each said mobile equipment being a combination of a subscriber equipment and a subscriber identification module that is provided with a subscriber identity and that is detachably connected to said subscriber equipment, whereupon a mobile equipment can be formed by attaching said subscriber identification module to any subscriber equipment, said method comprising:

a) comparing in said mobile equipment, said subscriber identity stored in said subscriber identification module with said subscriber identity stored in said subscriber equipment of the combination;

b) continuing based on said comparison, registration of said mobile equipment onto the network infrastructure, if said subscriber identity stored in said subscriber equipment of said combination is identical to said subscriber identity stored in said subscriber identification module, or c) checking the access right of said subscriber equipment by said network infrastructure, if said subscriber identity stored in said subscriber equipment of said combination is not identical to said subscriber identity stored in said subscriber identification module; and d) storing said subscriber identity in said subscriber equipment and continuing registration of said mobile equipment onto said network infrastructure, if said subscriber equipment has the access right to said network infrastructure according to said checking of the access right of the subscriber equipment.

12. The method according to claim 10 or 11, wherein, as a result of said checking the access right of said subscriber equipment, operation of said mobile equipment is terminated if said subscriber equipment does not have the access right to said network infrastructure.

13. The method according to claim 10, wherein said comparison of said subscriber equipment identity in said subscriber identification module of said mobile equipment with said equipment identity of said subscriber equipment is performed in said subscriber identification module.

14. The method according to claim 10, wherein said comparison of said subscriber equipment identity in said subscriber identification module of said mobile equipment with said equipment identity of said subscriber equipment is performed in said subscriber equipment.

15. The method according to claim 11, wherein said comparison of said subscriber identity in said subscriber identification module of said mobile equipment with said subscriber identity in said subscriber equipment is performed in said subscriber identification module.

16. The method according to claim 11, wherein said comparison of said subscriber identity contained in said subscriber identification module of said mobile equipment with said subscriber identity in said subscriber equipment is performed in said subscriber equipment.

17. A mobile equipment, comprising:
   a subscriber equipment provided with an equipment identity;
   an individual subscriber identification module that is detachably connected to said subscriber equipment; and
   means for comparing an equipment identity stored in said subscriber identification module with said equipment identity of said subscriber equipment; and
   based on said comparison, when said equipment identities are identical, said means for comparing activating a first alternative for checking an access right, whereupon said mobile equipment continues registration onto a network infrastructure, and when said equipment identities are different, said means for comparing activating a second alternative for checking said access right whereupon said access right of said subscriber equipment is checked by said network infrastructure.

18. The mobile equipment according to claim 17, further comprising:
   storing means for storing said equipment identity in said subscriber identification module.

19. The mobile equipment according to claim 18, wherein, in response to checking said access right of said subscriber equipment, said storing means being arranged to store said equipment identity in said subscriber identification module.

20. A mobile equipment, comprising:
   a subscriber equipment;
   a subscriber identification module that is provided with a subscriber identity and that is detachably connected to said subscriber equipment; and
   means for comparing said subscriber identity stored in said subscriber identification module with a subscriber identity stored in said subscriber equipment; and
   based on said comparison, when said subscriber identities are identical, said means for comparing activating a first alternative for checking an access right whereupon said mobile equipment continues registration onto a network infrastructure, and when said subscriber identities are different, said means for comparing activating a second alternative for checking said access right whereupon said access right of said subscriber equipment is checked by said network infrastructure.

21. The mobile equipment according to claim 20, further comprising:
   storing means for storing said subscriber identity in said subscriber equipment.

22. The mobile equipment according to claim 21, wherein, in response to checking said access right of said subscriber equipment, said storing means being arranged to store said subscriber identity in said subscriber equipment.

23. A mobile equipment, comprising:
   a subscriber equipment provided with an equipment identity;
   an individual subscriber identification module that is detachably connected to said subscriber equipment;
   a comparator which compares an equipment identity stored in said subscriber identification module with said equipment identity of said subscriber equipment; and
   based on said comparison, when said equipment identities are identical, said comparator a first alternative for checking an access tight, whereupon said mobile equipment continues registration onto a network infrastructure, and when said equipment identities are different, said comparator a second alternative for checking said access right, whereupon said access right of said subscriber equipment is checked by said network infrastructure.

24. The mobile equipment according to claim 23, further comprising:
   a storage device which stores said equipment identity in said subscriber identification module.

25. The mobile equipment according to claim 24, wherein, in response to checking said access right of said subscriber equipment, said storage device being arranged to store said equipment identity in said subscriber identification module.

26. A mobile equipment, comprising:
   a subscriber equipment;
   a subscriber identification module that is provided with a subscriber identity and that is detachably connected to said subscriber equipment;
   a comparator which compares said subscriber identity stored in said subscriber identification module with a subscriber identity stored in said subscriber equipment; and
   based on said comparison, when said subscriber identities are identical, said comparator activates a first alternative for checking an access right whereupon said mobile equipment registration onto a network infrastructure, and when said subscriber identities are different, said comparator activates a second alternative for checking said access right whereupon said access right of said subscriber equipment is checked by said network infrastructure.

27. The mobile equipment according to claim 26, further comprising:
   a storage device which stores said subscriber identity in said subscriber equipment.

28. The mobile equipment according to claim 26, wherein, in response to checking said access right of said subscriber equipment, said storage device being arranged to store said subscriber identity in said subscriber equipment.

* * * * *